United States Patent [19]

Connell

[11] 4,003,604
[45] Jan. 18, 1977

[54] COVER RETENTION SYSTEM

[76] Inventor: James Connell, 5017 Dianna Drive, Bloomfield Hills, Mich. 48013

[22] Filed: Oct. 14, 1975

[21] Appl. No.: 622,047

[52] U.S. Cl. .......................................... 301/37 CD
[51] Int. Cl.² .......................................... B60B 7/04
[58] Field of Search ............ 24/73 HC; 301/108 R, 301/108 A, 37 R, 37 P, 37 SS, 37 T, 37 C, 37 CD, 37 B

[56] References Cited

UNITED STATES PATENTS

| 3,873,161 | 3/1975 | Kretschmer | 301/37 CD |
| 3,876,257 | 4/1975 | Buerger | 301/37 C |

*Primary Examiner*—Stanley H. Tollberg
*Attorney, Agent, or Firm*—Harness, Dickey & Pierce

[57] ABSTRACT

This invention relates to decorative wheel covers with resilient fastening clips retained between spaced flanges on the inner periphery of the cover for fastening the cover to the outer surface of the wheel. The clip is made from a strap of spring material having a U-shaped body portion which forms an anchor between the flanges and an arm portion reversely bent and extending thereover for engaging the inner diverging flange of the wheel. The body portion and the arm portion have sharp tangs which are forced into the material of the flanges of the cover and wheel to have the plurality of the clips firmly support the cover outwardly over the wheel surface.

1 Claim, 4 Drawing Figures

COVER RETENTION SYSTEM

BACKGROUND OF THE INVENTION

Reference may be had to applicant's U.S. Pat. No. 3,771,834 and to the patents cited therein for a disclosure of the art on similar types of clips. The clips of the present invention withstand the removal of the cover so that they can be employed over again to retain the cover on the wheel if removed therefrom. Most of the clips heretofore employed were badly damaged when the cover was removed requiring new clips if available to remount the cover on the wheel.

CROSS REFERENCE TO A RELATED APPLICATION

Reference may be had to application Ser. No. 437,473, filed Jan. 28, 1974 as a continuation of application Ser. No. 284,283, filed Aug. 28, 1972 and assigned to the assignee of the present invention which is now allowed.

SUMMARY OF THE INVENTION

The present invention pertains to resilient fastening clips disposed between flanges located adjacent to the inner periphery of the wheel. The clip is provided with a U-shaped body which extends between the flanges with one or more sharp struck-out tangs which engage and cut into the bottom surface of the upper flange and retain the body portion between the flanges. At the inner end of the body portion the strip is reversely bent to extend outwardly over the top flange at an angle to form an arm portion which engages the diverging flange at the outer edge of the wheel. The arm portion has one or more struck-out tangs which are sharp to engage and cut into the metal of the flange to provide positive anchoring means for the cover at a plurality of spaced points. Beyond the struck-out portions the arm portion is extended to form a finger which engages the diverging flange after the wheel has been withdrawn a small distance to retain the sharp tangs from engagement with the wheel flange to permit the cover to be removed.

DESCRIPTION OF THE PREFERRED EMBODIMENTS

Figure 1:
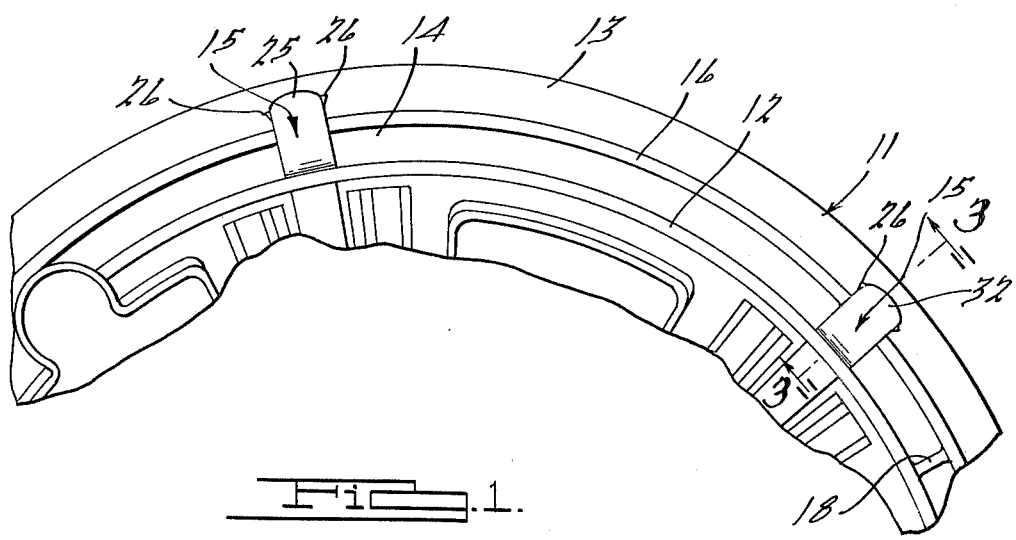
FIG. 1 is a fragmentary view of the inner portion of the wheel cover showing two spring clips retained thereon to secure the cover on a vehicle wheel embodying features of the present invention.
Figure 2:
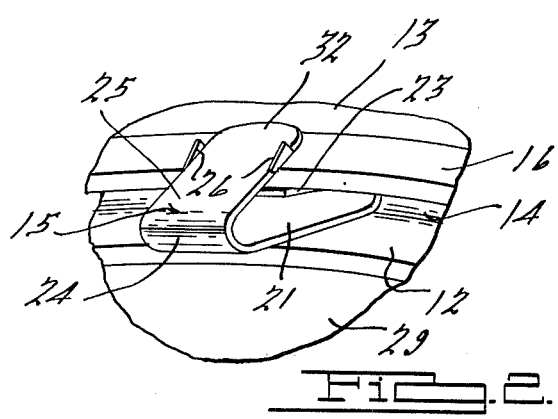
FIG. 2 is an enlarged perspective view of a pair of flanges in which a spring clip is secured, as shown in FIG. 1.

The wheel cover 11 of FIG. 1 has an axial flange 12 which extends inwardly from a radial flange 13. A flange 16 extends from the flange 13 spaced outwardly of the flange 12 forming a recess 14 in which spring secured clips 15 are mounted. The cover 11 is preferably molded from a plastic material and several flanges 18 may be provided between the flanges 12 and 16 to retain them in uniform spaced relation to each other which is aided by flanges 31 which connect the flange 12 to the central portion 29 of the wheel cover. The clip 15 is made from a spring strip and formed to have an inwardly presented U-shaped body portion 21 with sharp securing tangs 22 projecting outwardly of the upper end portion 23 which engages and cuts into the undersurface of the flange 16 and retains the body portion against outward movement.

The body portion of the clip 15 is reversely bent at 24 to have an arm portion 25 extending outwardly above the portion 23 of the clip and the flange 16 of the cover. The arm portion 25 has sharp pointed tangs 26 at both sides which engage the diverging flange 27 of the vehicle wheel 28. The central portion 29 of the wheel cover may take any desired shape to provide a rigid construction thereto. The arm portion 25 has a projecting finger 32 which is spaced from the inner surface of the diverging flange 27 of the wheel but which moves into engagement therewith when the wheel is withdrawn a short distance so as to prevent the tangs 26 from cutting further into the flange 27 when the wheel is being withdrawn. It will be noted in this arrangement that the body portion 21 of the clip 15 has the reversely bent end 33 abutting the wall of the flange 13 between the flanges 12 and 16 when the clip is completely inserted between the flanges.

Figures 3, 4:
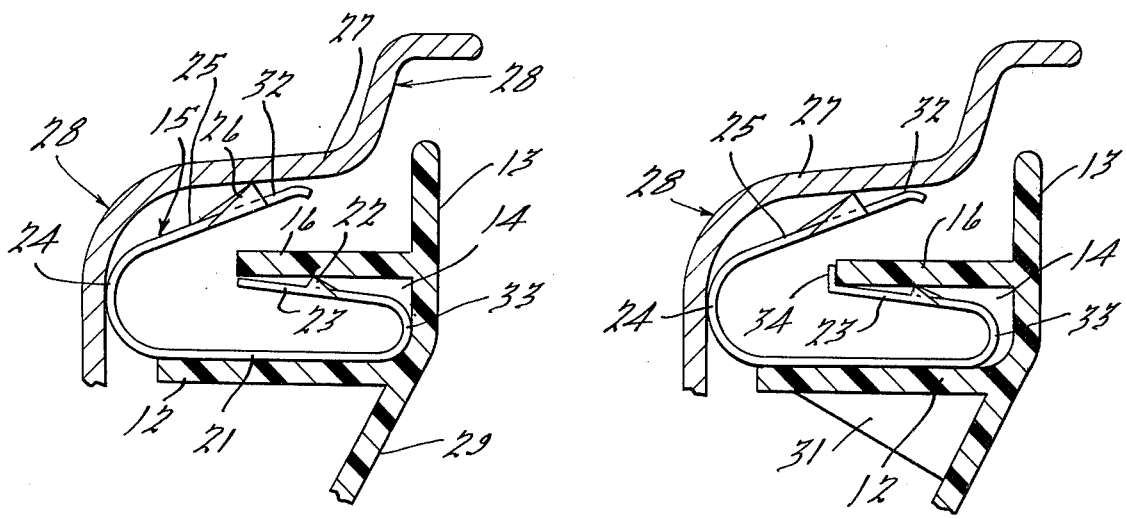
FIG. 3 is a sectional view of the wheel cover illustrated in FIG. 1 shown applied to a vehicle wheel.
FIG. 4 is a view of the structure illustrated in FIG. 3 with an end flange provided on the retaining portion of the clip.

The same construction is illustrated in the embodiment shown in FIG. 4 with the exception that the end of the projecting portion 23 of the clip 15 has a flange 34 extending outwardly thereof in position to abut the end of the flange 16 and space the reversely bent portion 33 from the radial flange 13 of the cover. The engagement of the flange 34 with the edge of the flange 16 accurately locates the reversely bent portion 33 from the radial flange 13 of the cover.

I claim:

1. In a cover secured by clips to a vehicle wheel, said cover having spaced flanges on its inner periphery extending inwardly from an outer wall, said clip being made from a spring strip having a first reversely bent portion forming a securing body which extends between said flanges, a sharp struck-out tang on the upper portion of the body engaging the underside of the top flange for cutting thereinto and retaining the clip body between the flanges, the end portion of the clip extending from between the flanges being reversely bent thereover to form an arm portion disposed at an angle, said bend abutting said wheel, an outwardly projecting cutting tang on said arm portion engaging the undersurface of a flange on the wheel, and a right-angle bend at the end of said body providing a flange which engages the inner edge of the top flange to space said first reversely bent portion at the end of the body a predetermined distance from the outer wall between the flanges.

* * * * *